(12) United States Patent
Yu (10) Patent No.: US 9,772,093 B2
(45) Date of Patent: Sep. 26, 2017

(54) LENS AND LENS SYSTEM AND USES THEREOF

(71) Applicant: Hangzhou Great Star Tools Co., Ltd. and Hangzhou Great Star Industrial Co., Ltd., Hangzhou, Zhejiang (CN)

(72) Inventor: Wentian Yu, Hangzhou (CN)

(73) Assignees: Hangzhou Great Star Tools Co., Ltd. (CN); Hangzhou Great Star Industrial Co., Ltd. (CN)

( * ) Notice: Subject to any disclaimer, the term of this patent is extended or adjusted under 35 U.S.C. 154(b) by 0 days.

(21) Appl. No.: 14/369,918

(22) PCT Filed: Apr. 16, 2014

(86) PCT No.: PCT/CN2014/075502
§ 371 (c)(1),
(2) Date: Oct. 9, 2014

(87) PCT Pub. No.: WO2015/157943
PCT Pub. Date: Oct. 22, 2015

(65) Prior Publication Data
US 2017/0045206 A1    Feb. 16, 2017

(51) Int. Cl.
*F21V 19/02* (2006.01)
*F21L 4/00* (2006.01)
*F21V 5/04* (2006.01)
*F21V 7/22* (2006.01)
*F21K 9/65* (2016.01)
(Continued)

(52) U.S. Cl.
CPC ............ *F21V 19/02* (2013.01); *F21K 9/65* (2016.08); *F21L 4/00* (2013.01); *F21V 3/0445* (2013.01); *F21V 5/006* (2013.01); *F21V 5/04* (2013.01); *F21V 5/048* (2013.01); *F21V 7/0075* (2013.01); *F21V 7/22* (2013.01); *F21V 7/0091* (2013.01); *F21Y 2115/10* (2016.08)

(58) Field of Classification Search
CPC ........ F21V 5/046; F21V 5/006; F21V 7/0075; F21V 7/22; F21V 19/02; F21V 9/65; F21V 3/0445; F21L 4/00
See application file for complete search history.

(56) References Cited

FOREIGN PATENT DOCUMENTS

| CN | 101018975 A | 8/2007 |
|---|---|---|
| CN | 102734673 A | 10/2012 |

(Continued)

*Primary Examiner* — David V Bruce
(74) *Attorney, Agent, or Firm* — Blank Rome LLP; Peter S. Weissman (57) ABSTRACT

A lens has a front surface, a rear surface, a side surface extending between the front surface and the rear surface. The rear surface defines a rear-facing chamber. The front surface has a central surface and an edge surface connected in a surrounding manner with the central surface, and the edge surface extends between the central surface and the side surface. The lens is an axisymmetric body and defines a central axis. The lens cooperates with the LED light source or similar light source which are located at the central axis and can move within the chamber, to form a lens system, so as to achieve a high capacity factor of the emergent light emitted from the light source, and functions of collimating and focusing for the incident light. This lens system can be applied to a flashlight with the function of variable focus.

22 Claims, 8 Drawing Sheets

(51) Int. Cl.
*F21V 3/04* (2006.01)
*F21V 5/00* (2015.01)
*F21V 7/00* (2006.01)
*F21Y 115/10* (2016.01)

(56) References Cited

FOREIGN PATENT DOCUMENTS

| CN | 203363685 U | | 12/2013 |
| CN | 103672420 A | * | 3/2014 |
| CN | 103672420 A | | 3/2014 |
| CN | 203843200 U | | 9/2014 |

* cited by examiner

LENS AND LENS SYSTEM AND USES THEREOF

FIELD OF THE INVENTION

This invention relates to an optical device, and especially relates to a lens and a lens system and uses thereof.

DESCRIPTION OF THE PRIOR ART

With the development of semiconductor material and process, light emitting diode (LED) is replacing traditional light source gradually. This results from the fact that the energy consumption of LED is far less than that of common incandescent lamps reaching the same brightness due to LED's special optical theory, and that LED has some advantages such as long lifetime, non-pollution and so on, which has a wide prospect in the field of illumination and backlight.

Among the LED illuminating products, in order to get proper light distribution and illumination intensity, a lens is often installed in front of the LED bead to converge light, such as using Fresnel lens to turn the light emitted from its focus into parallel light.

Moreover, in order to further make the most of LED light, currently the mainstream method is setting a chamber on the lens and placing LED light source in the chamber. Since the light emitted from the LED pointolite distributes in a 180-degree space, it can be done according to the theory above to make all the light emitted from LED enter the lens and adjust the emitting direction of incident light according to the lens structure, so as to achieve the effects such like convergence and dodging.

In some practical conditions, there is a specific request for the light spot of emergent light, which can be achieved by adjusting the relative position between the LED light source and the lens.

In order to meet all the requirements above, it is necessary to obtain the shape of lens by an accurate analog computing. Currently this kind of lens generally includes a front surface, a side surface and a rear surface. The rear surface defines a chamber as an area for placing LED light source, so as to make all light from LED limited in the chamber. In this case, the cambered surface shapes of the front surface, side surface and rear surface are calculated and derived according to the designed optical path, which also involves the mutual coordination among every surface. This is especially important to realize the control of the optical path.

Without considering the cost of lens material, the design above is relatively easy to achieve. With further consideration of the cost of lens material, various products are designed to save material, which is by reducing the distance between the front surface and the rear surface, i.e. making lens thinner, to save material. It is required that the shape precision of cambered surfaces of the front surface, rear surface and side surface and the requirement of fitting between surfaces is even higher, which makes the design more difficult and the design cycle longer.

Likewise, as far as processing lens, the more of the surfaces which need an accurate control or are hard to process, the process of the lens is more difficult, which thus affects the yield of products.

Therefore, a person skilled in the art devotes to developing a lens which can realize high capacity factor of LED light source (or light source similar to LED), functions of convergence and focusing, as well as advantages of saving material, provided with simple structure, and reducing the demanding accuracy requirement for optical surface as much as possible.

SUMMARY OF THE INVENTION

To achieve the objective above, this invention provides a lens and a lens system which is provided with the lens fitted with light source and uses thereof.

The lens includes a front surface, a rear surface, a side surface extending between the front surface and the rear surface. The front surface is located at the front part of the lens, and the rear surface is located at the rear part of lens. The rear surface defines a rear-facing chamber. The front surface includes a central surface and an edge surface connected in a surrounded manner with the central surface. The edge surface extends between the central surface and the side surface; the lens defines a central axis; the chamber includes a side wall and a bottom, the side wall and the bottom define a space of the chamber, and the central axis passes through the central surface and the bottom; lines corresponding to the edge surface on the central cross section which are edge lines, are consisted of segments parallel to the central axis and segments perpendicular to the central axis in an alternately connecting manner, that is similar to the shape of the right-angle step.

Further, any cross section of the lens along the central axis which is a central cross section is of the same shape, which defines that the lens is an axisymmetric body, and the central shaft is the central axis.

Further, a line corresponding to the central surface on the central cross section which is a central line is an arc line. Alternatively, the central surface is a cambered surface.

Further, the direction of an arc-shaped convex of the central line is away from the bottom, i.e. the central surface bulges towards the front of the lens.

Further, the extending direction of the edge lines parallel to the central axis is same as the direction of the arc-shaped convex of the central line, and the edge lines extend away from the central line in the direction perpendicular to the central axis, i.e. the edge surface and the central surface roughly form a bowl shape, and the opening of the bowl is located in the front of the lens, opposite to the opening of the chamber.

Further, lines corresponding to the side wall on the central cross section which are side wall lines, are straight lines or arc lines.

Further, the side wall lines are parallel to the central axis, i.e. the side wall is cylindrical.

Further, the bottom is a cambered surface or a plane. When the bottom is a cambered surface, the convex direction of the cambered surface is unlimited, which can be the same as or opposite to the convex direction of the central surface. The principle is that the bottom cooperates with the central surface to form a convex lens or to realize an effect of a convex lens.

Further, the side wall cooperates with the side surface to meet that a reflected light is parallel to the central axis, and the reflected light is reflected by the side surface after an incident light being emitted from a pointolite located at the central axis and entering the lens from the side wall. Under the condition that the refractive index of the lens and the position of the light source are determined, for the optical path of refraction and reflection, a derivation is gone through on the curve corresponding to the side surface on the central cross section using mathematical methods, and a curvilinear equation can be obtained, which can determine the cambered surface morphology of the side surface.

Further, the size of the edge surface meets that the reflected light reflected by the side surface is directly emitted from the edge surface. Combining with the above feature that the reflected light is parallel to the central axis, at this time, the emergent light of the edge surface is collimated light beam.

Further, the shape of the side surface meets that the incident light entering from the side wall is totally reflected by the side surface.

Further, the central surface cooperates with the bottom to meet that if the incident light emitted from the pointolite located at the central axis enters the lens from the bottom, the corresponding emergent light is emitted from the central surface only. In the condition that the refractive index of the lens is determined, the size matching of the central surface and the bottom can be obtained through a refractive index equation.

Further, the shape of the edge surface meets that the emergent light emitted from the central surface is not blocked by the edge surface, i.e. the step height of the edge surface shall not block the emergent light emitted from the central surface.

Further, the side surface is plated with a total reflection film.

Further, the total reflection film is silver.

Further, a material of the lens is polymethylmethacrylate (PMMA).

A lens system with the lens above includes the lens and a light source; the light source provides the incident light for the lens.

Further, the light source is located at the central axis of the lens.

Further, the light source can move along the central axis.

Further, the range of the movement of the light source is within the inside of the chamber of the lens, including the position which is 0 apart from the chamber.

Further, the range of the movement of the light source is from 0 mm apart from the chamber to 10 mm deep in the chamber.

Further, when the light source moves from 0 mm apart from the chamber to 10 mm deep in the chamber, the maximum included angle of the emergent light emitted from the central surface of the lens is 8 to 90 degree.

Further, the light source is a LED light source or similar to a LED light source, i.e. the light source provided with the same characters, such as good monochromaticity, the emitted light being distributed in a 180 degree space, etc., as a LED light source.

The lens system is applicable to a flashlight with the function of variable focus.

The lens and lens system in this invention have advantages below:
1. It can make full use of light emitted from LED light source (or similar to LED light source) to achieve a high capacity factor of optical energy.
2. It divides the emergent light into collimating emergent light and adjustable emergent light, and it can be very convenient to adjust the proportion of these two kinds of light in design to meet different practical requirements.
3. The range of the adjustable light spot is wide, which can meet various practical requirements.
4. Only the side surface needs a higher processing precision or difficulty, which reduces processing difficulty.
5. The lens is similar to a bowl shape, which saves material.

DETAILED DESCRIPTION OF THE PREFERRED EMBODIMENTS

Combining the figures, the following further explain the conception, specific structure and technical effect of this invention to fully understand the purpose, characters and effects of this invention.

Figure 1:
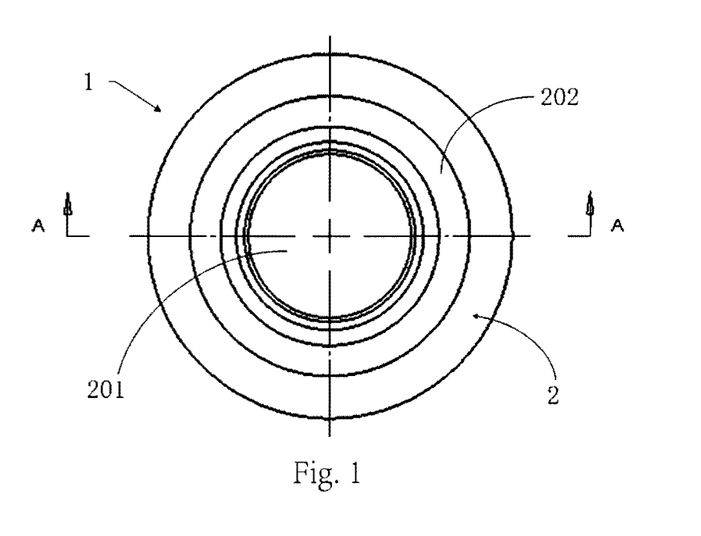
FIG. 1 is a front view according to a preferred embodiment of the lens of this invention.
Figure 2:
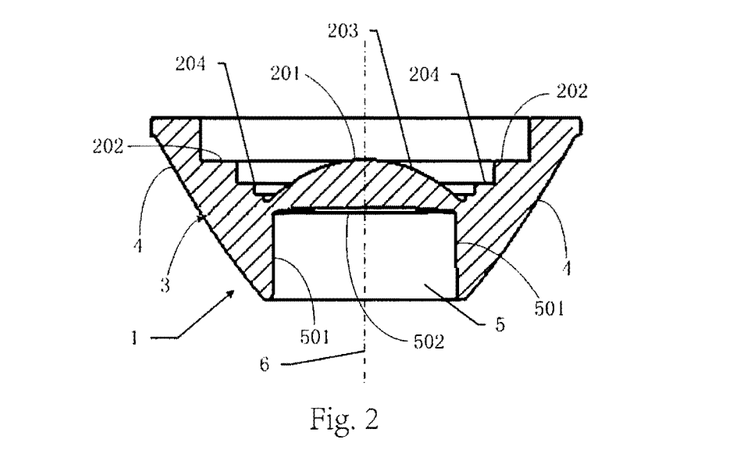
FIG. 2 is a sectional view along line A-A in FIG. 1.

The lens 1 shown in FIG. 1 and FIG. 2 includes a front surface 2, a rear surface 3 and a side surface 4 extending between the front surface 2 and the rear surface 3; the rear surface defines a rear-facing chamber 5; the front surface 2 includes a central surface 201 and an edge surface 202 connected with the central surface 201 in a surrounding manner; the edge surface 202 extends between the central surface 201 and the side surface 4; the lens 1 defines a central axis 6, and any cross section of the lens along the central axis, i.e. the central cross section, has the same shape, which defines that lens is an axisymmetric body, the central shaft thereof is the central axis 6; the chamber 5 includes a side wall 501 and a bottom 502, the side wall 501 and the bottom 502 define the space of the chamber, the central axis 6 passes through the central surface 201 and the bottom 502; the lines corresponding to the edge surface 202 on the central cross section, i.e. edge lines 204, are consisted of segments parallel to the central axis 6 and segments perpendicular to the central axis 6 in an alternately connecting manner. The line shape is similar to the shape of the right-angle step, i.e. the lines corresponding to the edge surface 202 on the central cross section are step-shaped, formed by connecting a plurality of segments parallel to or perpendicular to the central axis 6.

The line corresponding to the central surface 201 on the central cross section, i.e. a central line 203, is an arc line, which defines that the central surface 201 is a cambered surface which is symmetrical about the central axis 6. The cambered surface is a sphere surface in this embodiment, whose convex direction is opposite to the opening direction of the chamber 5, and is same as the extending direction of the edge surface 202 along the central axis 6. In the meanwhile, the edge surface 202 extends away from the central surface 201 in the direction perpendicular to the central axis 6. The side wall 501 of the chamber 5 is parallel to the central axis 6, i.e. the side wall 501 is cylindrical.

Figure 3:
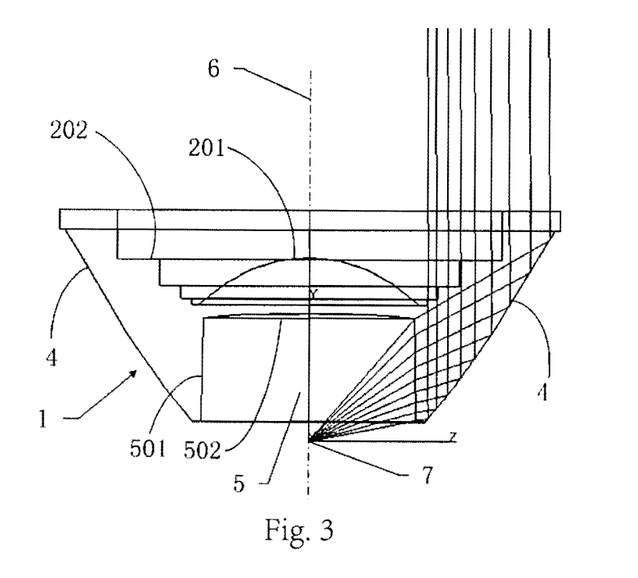
FIG. 3 is a schematic drawing showing incidence and emergence of part of the collimating light according to the lens shown in FIG. 2, which only shows the light on the right side of the central axis.
Figure 4:
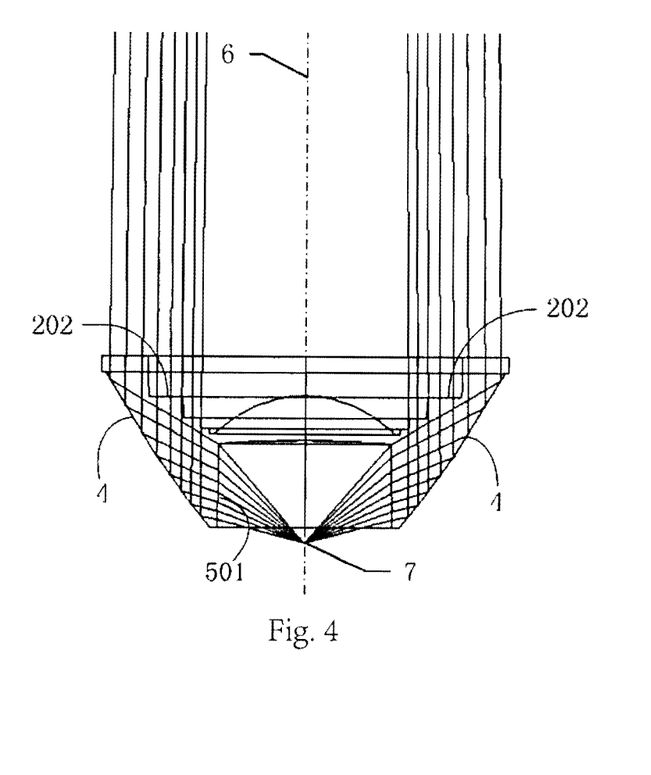
FIG. 4 is a schematic drawing showing incidence and emergence of all the collimating light according to the lens shown in FIG. 2.
Figure 5:
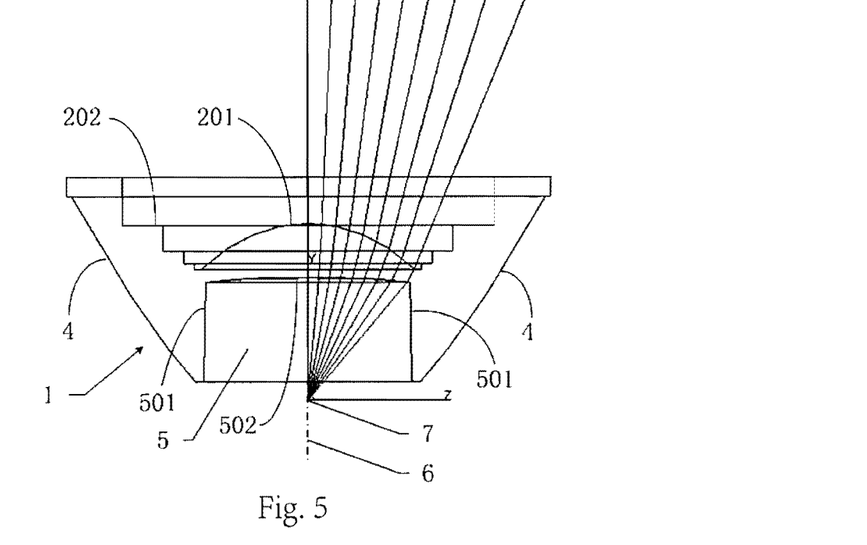
FIG. 5 is a schematic drawing showing incidence and emergence of part of the collimating light according to the lens shown in FIG. 2, and the light source is located outside the chamber, which only shows the light on the right side of the central axis.
Figure 6:
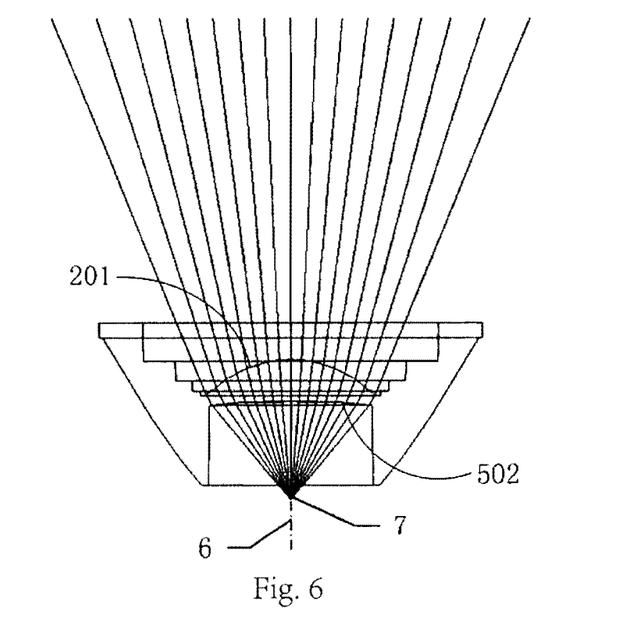
FIG. 6 is a schematic drawing showing incidence and emergence of all the focusing light according to the lens shown in FIG. 2, and the light source is located outside the chamber.
Figure 7:
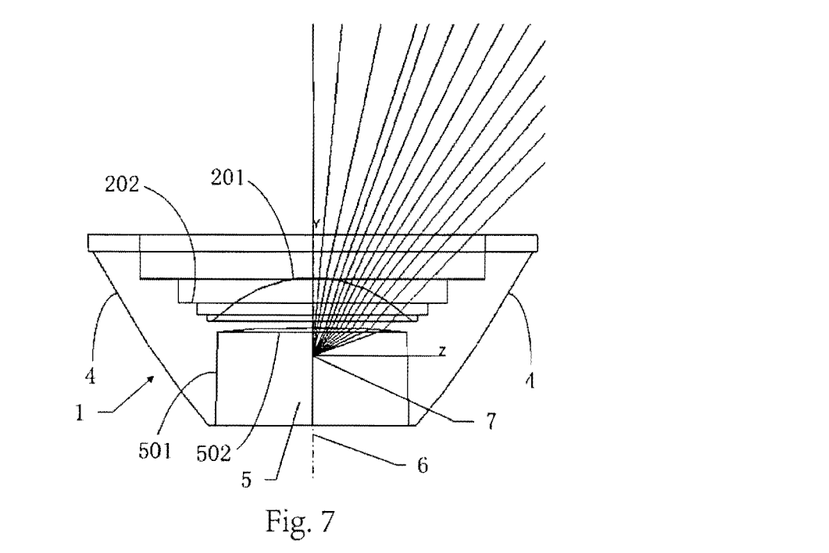
FIG. 7 is a schematic drawing showing incidence and emergence of part of the focusing light according to the lens shown in FIG. 2, and the light source is located inside the chamber, which only shows the light on the right side of the central axis.
Figure 8:
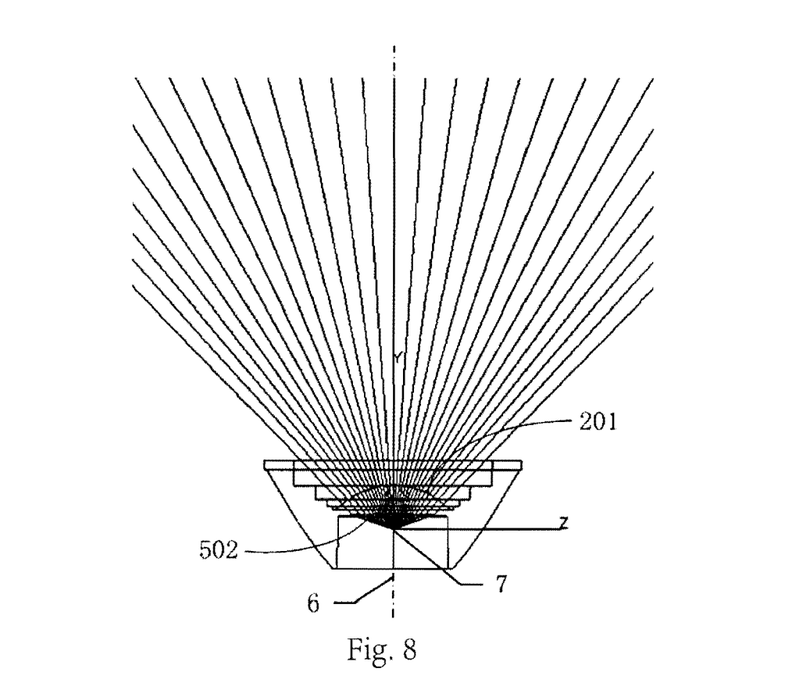
FIG. 8 is a schematic drawing showing incidence and emergence of all the focusing light according to the lens shown in FIG. 2, and the light source is located inside the chamber.

The lens 1 should be used together with the light source located at the central axis 6. The following is taking the pointolite as example to further explain the characteristics of the lens 1. As shown in FIG. 3 and FIG. 4, a pointolite 7 located at the central axis 6 provides the incident light which enters the lens 1 through the side wall 501, the reflected light reflected by the side surface 4 is parallel to the central axis 6, and is finally emitted from the edge surface 202. Since the edge surface 202 includes only the ring surface perpendicular to or parallel to the central axis 6, the emergent light emitted from the edge surface 202 is also parallel to the central axis 6, which achieves the collimating emitting of the incident light. Under the condition of using the side wall 501 and the edge surface 202 with mentioned shapes above and the lens material (refractive index) determined, it needs to only calculate accurately the cambered surface shape to achieve the collimation function. In the meanwhile the total reflection is achieved on the side surface 4 (the deriving calculating method about the side surface 4 will be described in detail below). In term of the difficulty of processing, the side wall 501 of the lens 1 and the edge surface 202 of the lens 1 include only the surface perpendicular to or parallel to the central axis 6, so that the processing is relatively simple. Only the side surface 4 needs a strict precision controlling, which reduces interaction effect between optical surfaces extremely.

Under the condition that the lens material (refractive index) is determined, in order to achieve the total reflection of the side surface 4, the shape of the side surface 4 will be further restricted. When it is unable to achieve the total reflection of the side surface 4 in design for some specific size requirements, the side surface 4 can be plated with a total reflection film, for example, silver.

As shown in FIGS. 5 to 8, the pointolite 7 is located at the central axis 6, and the pointolite 7 can move along the central axis 6 into the inside of the chamber 5. Under the condition of the lens material (refractive index) being determined, it can be done to get a variety of combinations of sizes of the central surface 201 and the bottom 502 through the refraction equation, so as to achieve that all the emergent light corresponding to the incident light entering the lens 1 from the bottom 502 is emitted from the central surface 201. In this embodiment, the central surface 201 and the bottom 502 are round spherical surface and elliptical spherical surface respectively and have the same convex direction, and form a convex lens together, and converge the incident light, so as to make the emergent light form a uniform light spot in a certain range. At this point, the shape of the edge surface 202 (or the step height of the stepped structure) cannot block the emergent light emitted from the central surface 201. When the pointolite 7 gradually moves into the chamber 5, the maximum included angle of the emergent light increases with it, which achieves the adjustment of the size of light spot.

Figure 9:
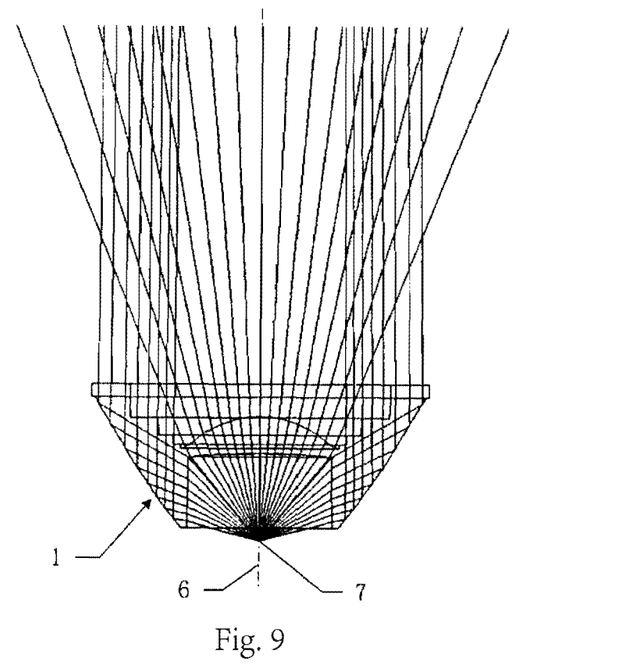
FIG. 9 is a schematic drawing showing incidence and emergence of all the light according to the lens shown in FIG. 2, and the light source is located inside the chamber.

FIG. 9 shows the whole ray diagram of the light emitted from the pointolite 7 after focused and collimated by the lens 1.

Figure 10:
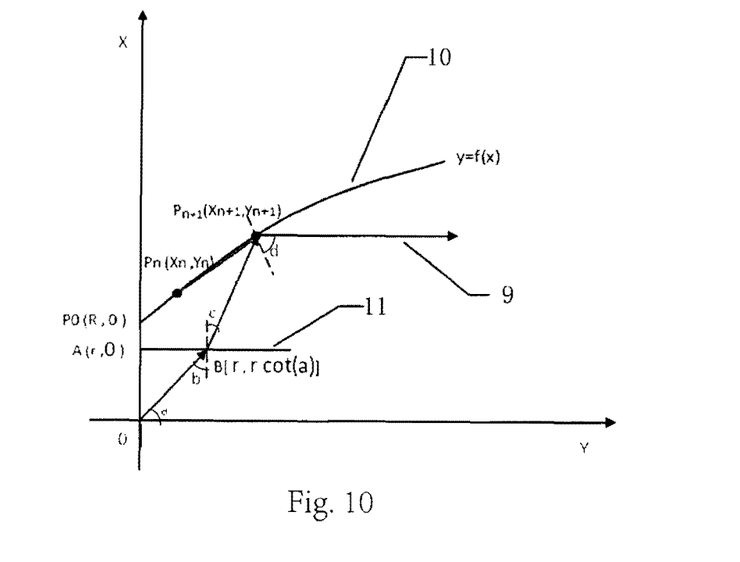
FIG. 10 is a calculation graph showing the curve corresponding to the side surface on the central cross section according to the lens shown in FIG. 2.

FIG. 10 is a graph of the curve equation corresponding to the side surface on the central cross section, which comprises Y axis, i.e. the central axis, the optical path 9, the curve 10 corresponding to the side surface on the central cross section, the side wall line 11 parallel to Y axis and the included angles a, b, c and d. The calculating method of curve equation is explained below in detail:

Setting the lens parameters: r—the opening radius of the chamber at the bottom of the lens, R—the radius of the lens bottom, n—the refractive index of the lens.

Objective: under the condition of the parameters above, forming a curve equation y=f(x) of the collimated light totally reflected 1. Solve the tangential equation at which the point Pn is located.

$$\because f'(x) = \tan d$$

$$\because (90° - c) + 2d = 180°$$

$$\therefore f'(x) = \tan\left(\frac{90° + c}{2}\right)$$

$$n \sin c = \sin b = \cos\ a \to c = \arcsin\left(\frac{\cos a}{n}\right)$$

So, the slope of the linear equation which passes through this point:

$$k = \tan\left(\frac{90° + \arcsin\left(\frac{\cos a}{n}\right)}{2}\right)$$

Substitute the coordinate $P_n(X_n, Y_n)$ into the equation, the tangential passing through the point $P_n$ meets the equation:

$$y = \tan\left(\frac{90° + \arcsin\left(\frac{\cos a}{n}\right)}{2}\right)(x - X_n) + Y_n \quad (1)$$

Also regard approximately the adjacent point $P_{n+1}$ is located at the tangential.

2. The light equation at which the point $P_{n+1}$ is located $$\because y = \tan c \cdot (x - r) + r \cot a \quad (2)$$

$$\because n \sin c = \sin b = \cos a \rightarrow c = \arcsin\left(\frac{\cos a}{n}\right)$$

$$\therefore y = \tan\left[\arcsin\left(\frac{\cos a}{n}\right)\right](x - r) + r \cot a$$

3. Constraint conditions:

The ultimate slope determined by the critical angle of total reflection $$k \geq \tan\left[\arcsin\left(\frac{1}{n}\right)\right].$$

So:

$$\frac{90° + \arcsin\left(\frac{\cos a}{n}\right)}{2} \geq \arcsin\left(\frac{1}{n}\right)$$

Since it is not easy to solve the equation directly, suppose a limit situation: when $a \rightarrow 90°$, $n \geq \sqrt{2} = 1.414$ can realize total reflection, which can be achieved when adopting PMMA and PC material; when $a \rightarrow 0°$, substitute in and get: when $n > 1$, the cambered surface can realize total reflection, it is obviously consistent;

Suppose $$f(a) = \frac{90° + \arcsin\left(\frac{\cos a}{n}\right)}{2} - \arcsin\left(\frac{1}{n}\right)$$

This function monotonically decreases in $0 < a < 90°$. Therefore, when the refractive index n is determined, if the cambered surface can totally reflect the light of the initial incident angle $a = \theta$, the light of $a' = \theta - \Delta\theta$ ($\theta$ and $\Delta\theta$ are both larger than 0) can be also totally reflected by the cambered surface certainly.

It can be known by the above determination of the particular values that, when $a \rightarrow 90°$, the total reflection can occur as long as the refractive index is larger than 1.414. Therefore, when the angle which is smaller than 90°, the total reflection can also occur, the result of $a \rightarrow 0°$ verifies the correctness of the reasoning.

Therefore, this curve can achieve total reflection for any initial incident angle of the light, and it is only necessary to consider the requirement of height in lens structure design.

4. Solve the discrete solution of the curve equation:

Solve the equation set of equation (1) and (2), use $P_0'$ coordinate as $P_n$ and substitute $a = 1°$ into the equations, so as to get the equation set about X and Y.

$$\begin{cases} y = \tan\left(\frac{90° + \arcsin\left(\frac{\cos 1°}{n}\right)}{2}\right)(x - R) + 0 & (3) \\ y = \tan\left[\arcsin\left(\frac{\cos 1°}{n}\right)\right](x - r) + r \cot 1° & (4) \end{cases}$$

Solve the equation set of equation (3) and (4) to get $P_1(X_1, Y_1)$

Use $P_1(X_1, Y_1)$ as $P_0$ and substitute $a = 2°$ into the equation (1) and (2) to get a new equation set.

$$\begin{cases} y = \tan\left(\frac{90° + \arcsin\left(\frac{\cos a}{n}\right)}{2}\right)(x - X1) + Y1 & (5) \\ y = \tan\left[\arcsin\left(\frac{\cos 2°}{n}\right)\right](x - r) + r \cot 2° & (6) \end{cases}$$

Similarly, solve the equation set of equation (5) and (6) to get $P_2(X_2, Y_2)$.

So, a series of point P coordinates can be obtained.

Using statistical software, such as Excel and MATLAB, to fit discrete points $P_0 \rightarrow P_n$ into the multinomial curve equation: $y = f(x)$.

Similarly it can be solved by programming, the program is shown below:

```
clear all;clc
%The Frist Step        define the adjustable variables
r=6;%                  select the opening radius
R=8.5;%                define the radius of the bottom of the cambered surface
n=1.49;%               define the refractive index of material
angles=(90:-0.5:40);%  define and calculate the angle range
%The Second Step       define the intermediate variable
num = length(angles);
Y0=R; Z0=0;
for i=1:num
a(i)=(angles(i)*pi/180);
c(i)=asin(cos(a(i))/n);
k1(i)=tan((pi/2+c(i))/2);
k2(i)=tan(c(i));
end
%The Third Step        cycle to solve the equation
for i=1:num
syms y;
f1=k1(i)*(y-Y0)+Z0;
f2=k2(i)*(y-r)+r*cot(a(i));
f=f1-f2;
yy=solve(f);
y=double(yy);
z=k1(i)*(y-Y0)+Z0;
Y0=y;
Z0=z;
Py(i)=Y0;
Pz(i)=Z0;
end
%The Forth Step        multinomial fitting non-spherical surface index
cftool
%          attention, setting x=P_y, y=P_z when fitting.
```

Figure 11:
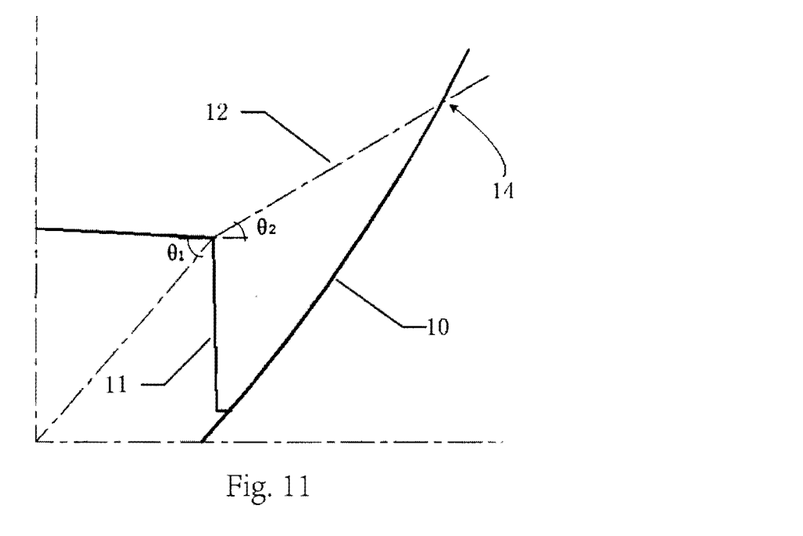
FIG. 11 is a graph showing the critical point of the curve corresponding to the side surface on the central cross section according to the lens shown in FIG. 2.

As shown in FIG. 11, the extending critical point 14 of the curve 10 can be determined by the optical path 12 and the curve 10, wherein the optical path 12 is an optical path which is produced by light entering from the very bottom of the side wall, and it meets the refraction relation:

$\sin \theta_1 = n \times \sin \theta_2$, n is the lens refractive index, $\theta_1$, $\theta_2$ are respectively the incident angle and refractive angle of light. In order to achieve that the incident light from the side wall can all reach the side surface, the terminal that the curve 10 extends upward should not be lower than the critical point 14. The critical point 14 also defines the size of the edge surface.

The same method can be also used to analyze the matching relation between the central surface and the bottom. At this point, it needs to be done to analyze the optical path produced by the light entering from the extreme edge of the bottom which is away from the central axis, making the extension width of the central surface enough to cover the refractive light in the optical path, thus to meet that when the incident light emitted from the pointolite located at the central axis enters the lens from the bottom, the corresponding emergent light is emitted from the central surface only.

Figure 12:
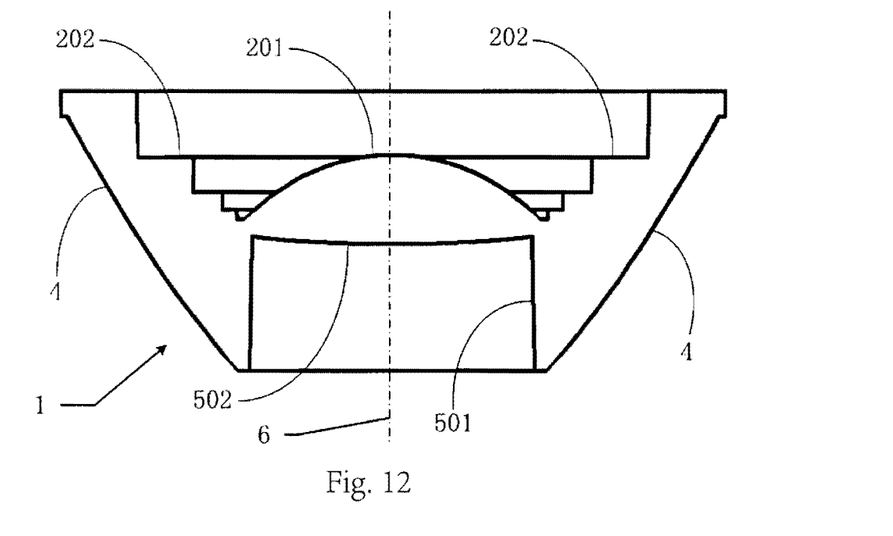
FIG. 12 is a schematic drawing according to another preferred embodiment of the lens of this invention, and the convex direction of the cambered surface of the bottom is away from the central surface.
Figure 13:
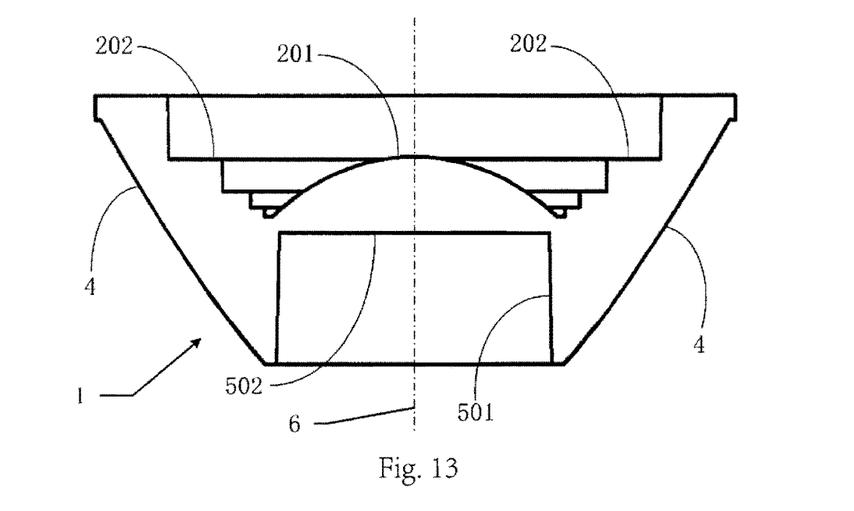
FIG. 13 is a schematic drawing according to another preferred embodiment of the lens of this invention, and the bottom is a plane.

The lens shape based on this invention is not limited by the structure as shown in the embodiment above. FIG. 12 indicates an alternative lens shape, with the convex direction of the cambered surface of the bottom 502 being far away from the central surface 201. And FIG. 13 indicates an alternative lens shape, with the bottom 502 being plane.

It is also worth to be noted that the shape of the side wall 501 can be various; considering the curve equation of the segment of the side wall when calculating, through the calculation method above, the cambered surface of the side surface matching the side wall can be obtained.

The various lenses above can cooperate especially with LED light sources (or light source similar to LED) to form a lens system, which can achieve the functions of focusing and collimating while getting a high capacity factor. When a LED light source is located at the central axis 6 and its moving range is within the inside of the chamber 5 (including 0 distance from the chamber 5), the light emitted from the LED light source can be totally received by the side wall 501 and the bottom 502. When adjusting the position of the LED light source within the chamber 5, it can be achieved to control the size of the emergent light spot.

In a more specific embodiment, the lens material is polymethylmethacrylate, and the refractive index is 1.49. It is designed that, when the range of the movement of the light source is from 0 to 10 mm deep in the chamber 5, the variation range of the maximum included angle of the emergent light emitted from the central surface 201 of the lens 1 is 8 to 90 degrees.

Figure 14:
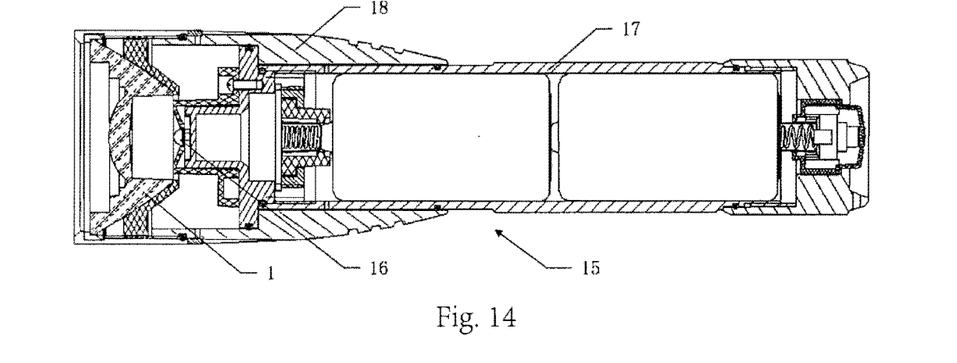
FIG. 14 is a schematic drawing according to a preferred embodiment of the flashlight using the lens system of this invention, and the LED light source is located at the opening of the chamber of the lens.
Figure 15:
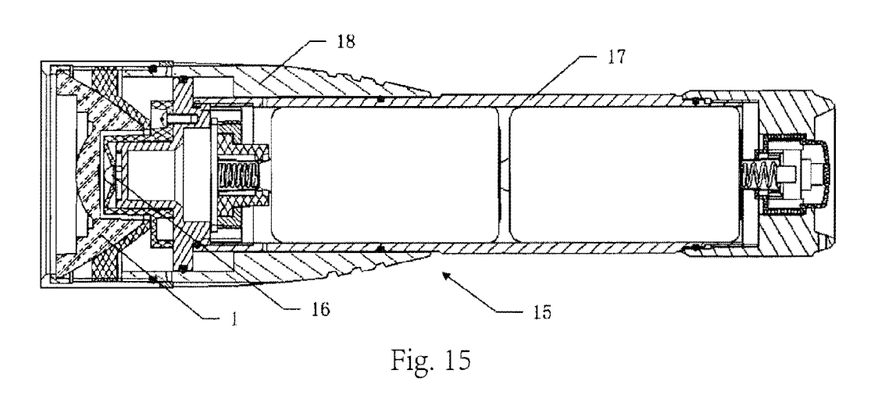
FIG. 15 is a schematic drawing showing that the LED light source of the flashlight shown in FIG. 14 is located inside the chamber of the lens.

The lens system above can be applied to a flashlight with the function of variable focus and works as the light source and optical element of the flashlight. FIG. 14 and FIG. 15 show a flashlight using the lens system of this invention, wherein the flashlight 15 comprises a handle 17 and a lens cone 18, which both adopt telescopic structures; thereby it can stretch and retract within limits. The lens 1 and the LED light source 16 are respectively fixed on the lens cone 18 and the handle 17. The function of variable focus is achieved by relative movement from stretching and retracting between the handle 17 and the lens cone 18. FIG. 14 and FIG. 15 indicate respectively that the LED light source 16 is located at the chamber opening of the lens 1 and within the chamber of the lens 1. The relative movement of the handle 17 and the lens cone 18 is not limited to the way above, but both can adopt a thread structure to achieve the telescopic function. Any connecting method which makes a relative movement between the handle 17 and the lens cone 18 can achieve the function of variable focus of the flashlight.

The lens system above can also be applied to the other applications which need the light spot size adjustment (or the alternation of focusing and diverging), such as the flash lamp of camera and stage illumination etc.

Moreover, it is pointed out that, because of the effects of the lens processing, the assembly accuracy of the flashlight and the size of the LED light source, in practice, some of the collimated light shall not be collimatingly emitted, which will cause the fact that, in the light spot would appear a bright ring whose size varies with the movement of the LED light source. It is depended on the processing and assembly accuracy in practice and the selection of the LED light source size.

The preferred embodiment of this invention is described in detail above. It shall be known that according to this invention, an ordinary one skilled in this art does not need any creative work to conceive the modifications and variations. Therefore, any person skilled in this art can get any technical solution by logically analyzing, inferring and limited experiments, which should be in the protecting scope defined by claims of this invention.

The invention claimed is:

1. A lens, wherein, the lens comprises a front surface, a rear surface, a side surface extending between the front surface and the rear surface; the rear surface defines a rear-facing chamber; the front surface comprises a central surface and an edge surface connected in a surrounding manner with the central surface; the edge surface extends between the central surface and the side surface; the lens defines a central axis; the chamber comprises a side wall and a bottom, the side wall and the bottom define a space of the chamber, and the central axis passes through the central surface and the bottom; lines corresponding to the edge surface on the central cross section which are edge lines, are consisted of segments parallel to the central axis and segments perpendicular to the central axis in an alternately connecting manner;

any cross section of the lens along the central axis which is a central cross section is of the same shape;

a line corresponding to the central surface on the central cross section which is a central line is an arc line.

2. The lens according to claim 1, wherein, the direction of an arc-shaped convex of the central line is away from the bottom.

3. The lens according to claim 2, wherein, the extending direction of the edge lines parallel to the central axis is same as the direction of the arc-shaped convex of the central line, and the edge lines extend away from the central line in the direction perpendicular to the central axis.

4. The lens according to claim 1, wherein, the lines corresponding to the side wall on the central cross section which are side wall lines, are straight lines or arc lines.

5. The lens according to claim 4, wherein, the side wall lines are parallel to the central axis.

6. The lens according to claim 3, wherein, the bottom is a cambered surface or a plane.

7. The lens according to claim 3, wherein, the side wall cooperates with the side surface to meet that a reflected light is parallel to the central axis, and the reflected light is reflected by the side surface after an incident light being emitted from a pointolite located at the central axis and entering the lens from the side wall.

8. The lens according to claim 7, wherein, the size of the edge surface meets that the reflected light reflected by the side surface is emitted directly from the edge surface.

9. The lens according to claim 8, wherein, the shape of the side surface meets that the incident light entering from the side wall is totally reflected by the side surface.

10. The lens according to claim 9, wherein, the central surface cooperates with the bottom to meet that if the incident light emitted from the pointolite located at the central axis enters the lens from the bottom, the corresponding emergent light is emitted from the central surface only.

11. The lens according to claim 10, wherein, the shape of the edge surface meets that the emergent light emitted from the central surface is not blocked by the edge surface.

12. The lens according to claim 1, wherein, the side surface is plated with a total reflection film.

13. The lens according to claim 12, wherein, the total reflection film is silver.

14. The lens according to claim 1, wherein, a material of the lens is polymethylmethacrylate.

15. A lens system using the lens according to claim 7, wherein, the lens system comprises the lens and a light source which provides the incident light for the lens.

16. The lens system according to claim 15, wherein, the light source is located at the central axis of the lens.

17. The lens system according to claim 16, wherein, the light source can move along the central axis.

18. The lens system according to claim 17, wherein, the range of the movement of the light source is within the inside of the chamber of the lens.

19. The lens system according to claim 18, wherein, the range of the movement of the light source is from 0 mm apart from the chamber to 10 mm deep in the chamber.

20. The lens system according to claim 19, wherein, when the light source moves from 0 mm apart from the chamber to 10 mm deep in the chamber, the maximum included angle of the emergent light emitted from the central surface of the lens is 8 to 90 degrees.

21. The lens system according to claims 16, wherein, the light source is a LED light source.

22. The uses of any one of the lens systems of claim 21, wherein, the lens system is applicable to a flashlight with the function of variable focus.

* * * * *